(12) United States Patent
James et al.

(10) Patent No.: US 8,791,389 B2
(45) Date of Patent: Jul. 29, 2014

(54) ELECTRIC ARC WELDING WIRE

(75) Inventors: Matthew J. James, Brunswick, OH (US); Teresa A. Melfi, Kirtland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2873 days.

(21) Appl. No.: 11/338,507

(22) Filed: Jan. 25, 2006

(65) Prior Publication Data
US 2007/0170152 A1   Jul. 26, 2007

(51) Int. Cl.
*B23K 35/22*   (2006.01)
*B05D 5/12*   (2006.01)
*B32B 9/00*   (2006.01)

(52) U.S. Cl.
USPC ............ 219/146.1; 219/73; 219/55; 219/137; 219/131; 219/121; 427/117; 427/118; 427/356; 428/698; 428/697; 428/469; 428/699; 428/368

(58) Field of Classification Search
USPC ......... 219/73, 146.1, 55, 75, 76.14, 121, 127, 219/131, 137, 605, 609; 338/329, 332, 266; 427/117, 118, 356; 428/698, 697, 469, 428/699, 368
See application file for complete search history.

(56) References Cited

U.S. PATENT DOCUMENTS

| | | | |
|---|---|---|---|
| 2,170,019 A * | 8/1939 | Gaylord | 228/244 |
| 3,102,827 A | 9/1963 | Kriewall et al. | |
| 3,438,755 A | 4/1969 | Millhoff | |
| 3,443,914 A | 5/1969 | Kazutami | |
| 4,510,374 A * | 4/1985 | Kobayashi et al. | 219/146.1 |
| 6,033,764 A * | 3/2000 | Balents et al. | 428/209 |
| 6,079,243 A | 6/2000 | Inoue | |
| 6,787,735 B1 | 9/2004 | Yamaoka | |
| 2003/0189034 A1 | 10/2003 | Kataoka | |
| 2006/0000818 A1 | 1/2006 | Kim | |
| 2006/0118537 A1 | 6/2006 | Kim | |

FOREIGN PATENT DOCUMENTS

| | | |
|---|---|---|
| EP | 926863 | 5/1963 |
| EP | 956612 | 4/1964 |
| EP | 1 571 136 | 7/1980 |
| EP | 1 350 592 A1 | 10/2003 |
| GB | 926863 | 5/1963 |
| GB | 956612 | 4/1964 |
| GB | 1 571 136 | 7/1980 |
| JP | 62160538 | 12/1989 |
| JP | 4-41099 | 2/1992 |
| JP | 02150181 | 12/1992 |
| JP | 104883/1999 | 4/1999 |
| JP | 2001287623 | 2/2003 |

OTHER PUBLICATIONS

EP 06 02 6188 Search Report dated May 16, 2007.

* cited by examiner

*Primary Examiner* — Dana Ross
*Assistant Examiner* — Ket D Dang
(74) *Attorney, Agent, or Firm* — Hahn Loeser & Parks LLP

(57) ABSTRACT

An electric arc welding wire having an outer cylindrical surface and an electrically conductive layer on the surface wherein the layer comprises an alloy of copper with the copper content being about 60% to about 90% by weight of said alloy. Furthermore, the layer can be made thin with a thickness of less than about 0.50 microns while using essentially pure copper.

19 Claims, 3 Drawing Sheets

ELECTRIC ARC WELDING WIRE

BACKGROUND OF THE INVENTION

In electric arc welding of pipe sections, it is normal practice to use one or more electrodes fed through drive rolls into a groove between adjoining pipe sections. The groove is filled with a granular flux for protecting the weld bead formed by the melted electrode and the melted workpieces at the bottom of the groove. The welding process produces a weld bead of molten metal covered by the molten slag formed from the granular flux. The electrode, whether solid wire or cored wire, includes an outer layer of copper for facilitating the electrical contact between the steel of the electrode, and the power lead from a welding power source. The resistivity of copper is quite low so the wire passing through the contact tip of the welding torch receives current from the contact tip without large heat loss in the torch itself and without arcing between the wire and the contact tip. Consequently, it is very important that the outer layer of the advancing weld metal be copper; however, during the feeding operation the copper layer on the wire often creates flakes and particles of pure copper that are mechanically removed from the surface during the forced feeding of the welding wire through the liner into the torch and through the torch contact tip into the welding operation. These flakes or particles of copper have a substantial mass and commingle with the granular flux covering the welding operation.

Particles of copper dispersed in the flux are melted by the molten slag and often pass through the molten slag into contact with the weld bead. The bead metal cools and solidifies at approximately 2800° F.; however, the copper in the molten slag remains molten and migrates through the slag to the surface of the solidified weld bead. This molten copper has a low surface tension and tends to migrate into the solidified weld metal at the grain boundaries. Copper in the grain boundaries of the weld bead can cause subsequent cracking, referred to in the industry as "copper cracking." Copper cracking is a specific example of a generic phenomenon known as liquid metal embrittlement (LME). LME involves cracking of a solid substrate caused by a liquid metal. Copper cracking becomes even more pronounced as the granular flux is reused, thereby accumulating greater amounts of copper flakes or particles dispersed through the granular flux. Thus, as flux is reused, there is an increased amount of copper particles to migrate through the molten slag over the top of the solidified weld metal, thus increasing the tendency for subsequent copper cracking of the weld metal bead. To reduce this tendency, the welding industry sometimes uses only new granular flux during each pass in the pipe welding process. This is costly and results in a substantial waste of excellent, effective granular flux. Another procedure for reducing copper cracking is to assure no abrasive action against the wire as it is being fed. This requires expensive and frequent attention to refurbishing the total welding equipment, often during the use of the equipment for pipe welding. Both of these procedures involve the objective of reducing the amount of copper in the granular flux. They are expensive and time consuming procedures requiring routine and expensive intervention. Also, the use of copper free wire can lead to excessive tip heating and electrical erosion, particularly at the high currents used in pipe welding.

THE INVENTION

The present invention relates to an electric arc welding wire having an outer cylindrical surface with an electrically conductive layer on the surface, wherein the layer is composed of an alloy that will not lead to LME of the weld metal. In accordance with the primary aspect of the present invention, the outer layer of the welding wire comprises an alloy of copper where the cooper content is in the range of 60% to 90% by weight of the alloy. By using a copper alloy, as opposed to essentially pure copper, it has been found that the flaking of the alloy from the outer surface of the weld wire does not cause copper cracking of the weld metal. The copper alloy apparently has higher surface tension and cannot migrate into the grain boundaries in the solidified weld metal by capillary action or otherwise. The use of copper alloy, as opposed to pure copper, has been found to drastically reduce the copper cracking of the weld metal, even though the outer layer still produces a low resistivity for performing the electrical connection between the moving wire and the contact tip connected to the power lead of a power source. The substitution of a copper alloy for pure copper as the surface layer for the electrical arc welding wire still produces an effective resistivity greater than $2.0 \times 10^{-8}$ ohm-meter at 20° C. "Effective resistivity" is the resistivity value of an alloy where the resistivity of one metal is multiplied by its percentage and added to the resistivity of the second metal multiplied by its percentage. Resistivity of representative metals are:

| Copper | 1.67 | $10^{-8}$ ohm-meter at 20° C. |
|---|---|---|
| Aluminum | 2.69 | $10^{-8}$ ohm-meter at 20° C. |
| Zinc | 5.92 | $10^{-8}$ ohm-meter at 20° C. |
| Nickel | 6.84 | $10^{-8}$ ohm-meter at 20° C. |
| Cadmium | 7.40 | $10^{-8}$ ohm-meter at 20° C. |
| Tin | 12.80 | $10^{-8}$ ohm-meter at 20° C. |

Thus the effective resistivity of an alloy with 70% copper and 30% nickel is 3.22. This is about 40-50% the actual resistivity of pure copper.

A low effective resistivity (2.0-4.0) is accomplished by having a greater portion of the alloy being copper and a lesser portion of the alloy being a higher resistivity material such as nickel, zinc, chromium, cadmium or tin. Preferably, the alloy is a copper-nickel alloy with about 20-30% nickel and the remainder copper. It has been found that this alloy has a resistivity between 2.0-4.0, but will not penetrate into the grain boundaries of the solidified weld metal, even if the alloy migrates through the molten slag on the top of the weld bead subsequent to the welding operation.

In accordance with another aspect of the present invention, the alloy on the outer surface of the welding wire is copper and one or more metals selected from the class consisting of nickel, zinc, chromium, cadmium and tin. In one embodiment, the welding wire is a cored wire, either metal cored or flux cored. Furthermore, it has been found that the welding wire with the copper alloy on the outer surface is useful for sub arc welding especially when it is cored wire. The conductive layer is applied onto the outer surface of the welding wire in accordance with standard procedures. The method of applying the outer coating of metal alloy can be varied as determined by the manufacture of the novel electrode.

In accordance with a second embodiment of the invention, the electric arc welding wire has an electrically conductive layer on the outer surface which layer has a nominal thickness of less than 0.5 microns with the layer being greater than 99% by weight of copper. This is a small weight as a percentage of the electrode. The preferred thin layer has a controlled thickness in the range of 0.03 to 0.35 microns. Thus, pure copper is still used on the wires; however, the copper available for scraping from the wire is reduced drastically from a relatively thick layer as in the prior art to an ultra-thin layer, such as less than about 0.5 microns. This reduction of layer thickness is a reduction of at least 50% in the amount of copper on the wire. In practice the copper has a thickness in the range of 0.6-1.70 microns, but generally in the range of 0.8-1.2 microns. It has been found that the reduced amount of copper (less than 0.5 microns) still produces the desired electrical characteristics, but decreases the tendency for the outer layer to create a relatively large flakes or particles of pure copper. Thus, any copper coming off the wire during the feeding operation will be extremely small in size with a mass substantially reduced. The copper particles migrating through the molten slag will have a very small tendency to penetrate the solidified weld bead.

The primary object of the present invention is the provision of an electric arc welding wire having an outer electrically conductive layer that reduces the tendency to produce large particles or flakes of substantially pure copper at the surface of the weld bead.

A further object of the present invention is the provision of an electric arc welding wire, as defined above, which welding wire has a layer that is formed of an alloy of copper and another metal. By using a copper alloy, the alloy migrating to the weld bead does not penetrate the boundaries of the solidified weld bead as equal sized masses of pure copper.

Still a further object of the present invention is the provision of an electric arc welding wire having an electrically conductive layer, which layer is formed of substantially pure copper but has a thickness of less than 0.5 microns. In this manner, the available mass of particles removed from the advancing welding wire is not large enough to create a volume of copper sufficient to lead to copper cracking of the weld metal.

These and other objects and advantages will become apparent from the following description taken together with the accompanying drawings.

PREFERRED EMBODIMENT

Figure 1:
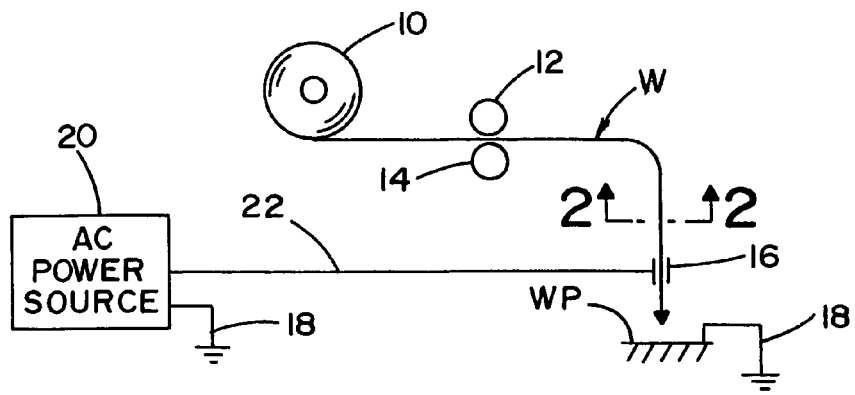
FIG. 1 is a schematic layout of a submerged arc welding system.
Figure 3:
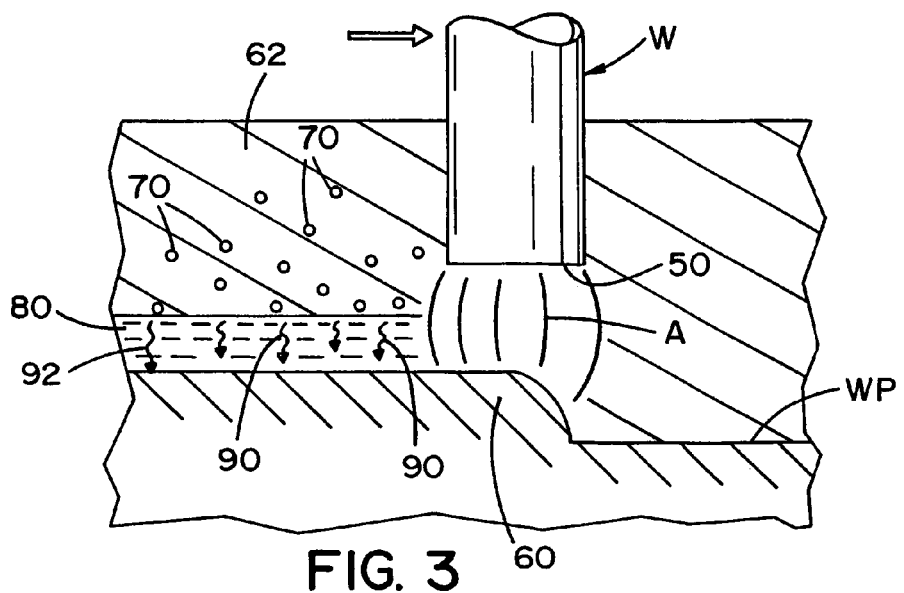
FIG. 3 is a side elevational view illustrating the relationship of the electrode and workpiece with surrounding flux as used in a submerged arc welding process.
Figure 4:
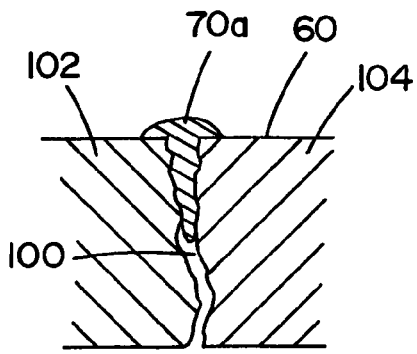
FIG. 4 is an enlarged cross-sectional view of the prior art illustrating migration or penetration of copper into a grain boundary, when large particles of pure copper are deposited on the outer surface of solidified weld metal during the arc welding process as shown in FIG. 3.
Figure 5:
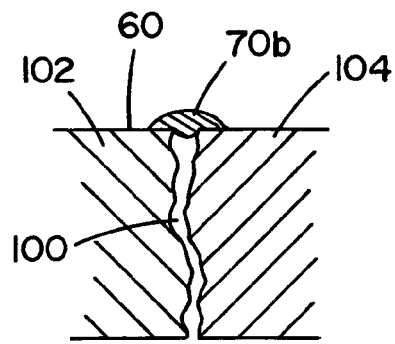
FIG. 5 is an enlarged cross-sectional view, similar to FIG. 4, showing the difference between a pure copper mass on the surface of the solidified weld metal as shown in FIG. 4 and an alloy of copper used in accordance with the present invention.

The present invention relates primarily to submerged arc welding, schematically illustrated in FIG. 1 as an AC MIG process using an electric arc welding wire W provided on reel 10 and pulled from the reel by drive rolls 12, 14. The drive rolls force wire W through contact tip 16 toward grounded 18 workpiece WP where the welding wire W is melted by electric current from AC power source 20. To perform the welding process, power lead 22 is connected with contact tip 16 toward workpiece WP which is grounded 18. In accordance with standard technology, welding wire W includes solid wire 30 having an outer cylindrical surface 32 covered by a low resistivity layer 40. In the prior art, layer 40 is essentially pure copper with a resistivity of $1.67 \times 10^{-8}$ ohm-meter. The submerged arc welding process is illustrated in more detail in FIG. 3 wherein welding wire W has a lower end 50 facing workpiece WP. Current from power source 20 creates arc A as electrode or wire W traverses in the direction of the arrow shown in FIG. 3. The welding process melts metal from workpiece WP and from the advancing welding wire W to create a molten metal puddle ultimately solidified to form a weld bead 60. Wire W moves through a large mass of granular flux 62 used to protect the wire and workpiece during formation of weld bead 60. In practice, the welding procedure and mechanism together with other mechanical ablation of the surface of moving wire W creates copper flakes or particles 70 comprising a mass of the metal forming layer 40. These flakes or particles are relatively large in some instances and accumulate as globules in granular flux 62 as shown schematically in FIG. 3. Large particles or flakes 70 from the metal of layer 40 are masses of pure copper. These masses melt and migrate through molten slag 80 in migration lines 90 representing the molten copper particles or masses 70 moving through the molten slag. The slag ultimately solidifies at a temperature lower than the solidification temperature of weld metal or bead 60; however, as indicated by migration lines 92, in many instances the copper flakes or particles 70 actually migrate to and into contact with the weld metal as it is being solidified and forming grains. The result of copper on the surface of hot bead 60 is illustrated in FIG. 4 wherein the large mass of copper 70a has migrated through molten slag 80 onto the upper surface of weld bead 60. This phenomenon is the prior art problem to which this invention is directed. On the weld bead, the pure copper of mass 70a has a low surface tension and penetrates into grain boundary 100 of grains 102, 104. The size of particle 70a is disproportionate to the grain boundary size 100; however, FIG. 4 schematically illustrates what happens when the molten mass of pure copper migrates through molten slag 80 and engages weld metal bead 60. The pure copper enters the grain boundaries of the solidified weld bead, thus reducing the strength of the overall weld to the point where the existing residual stresses will form a crack. This crack is an unacceptable defect. As explained in the introductory portion of this disclosure several techniques have been used to remove the tendency for the copper to accumulate on the surface of the weld bead and cause subsequent copper cracking. The present invention solves this problem in a more efficient, less costly and positive manner. In accordance with the invention, layer 40 is an alloy of copper and the copper constituent is less than 90% by weight of the alloy. In accordance with the invention, layer 40 is an alloy of copper and one or more of the metals selected from the class consisting of nickel, zinc, chromium, cadmium and tin. Of course, other alloying metals can be used so long as the effective resistivity of layer 40 is less than about $4.0 \times 10^{-8}$ ohm-meter. The copper alloy of layer 40 includes 60-80% copper and 20-40% nickel in the preferred embodiment. With 90% copper, the effective resistivity is approximately 2.2. When the copper is reduced to about 70%, the effective resistivity is increased to about 3.2. Consequently, in accordance with the invention, the effective resistivity of the copper alloy is in the general range of 2.0-4.0. It has been found that the surface tension and other physical characteristics associated with the copper alloy is different than the physical action of pure copper, as shown in FIG. 4. The copper alloy has a major portion of copper and only 10% to about 40% of another metal or metals. When such copper alloy mass 70b having the same size as mass or particle 70a in FIG. 4 accumulates on the surface of weld metal bead 60, as shown in FIG. 5, the copper alloy does not migrate into the grain boundary 100. Thus, the use of a copper alloy, as contemplated by the present invention does not cause subsequent copper cracking of the weld metal as in the prior art. No special mechanical or maintenance procedures are necessary to prevent copper cracking when using a copper alloy with a high percentage of copper as taught by the present invention.

Figure 2:
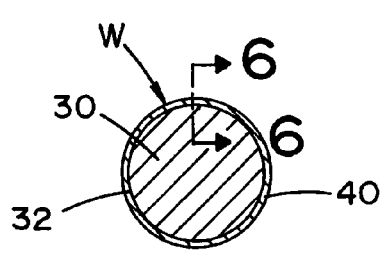
FIG. 2 is an enlarged cross-sectional view taken generally along line 2-2 of FIG. 1.
Figure 2A:
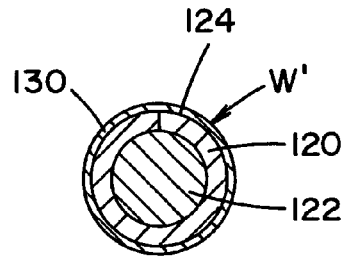
FIG. 2A is a cross-sectional view, similar to FIG. 2, showing a cored electrode as the welding wire.
Figure 6:
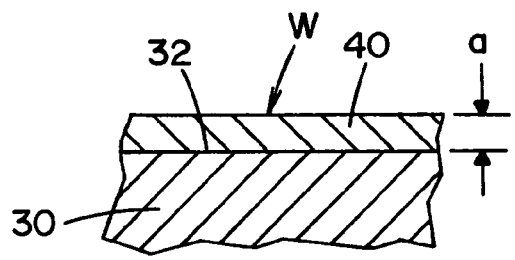
FIG. 6 is an enlarged partial cross-sectional view taken generally along line 6-6 of FIG. 2.

Cored wire W' as shown in FIG. 2A, can be used to practice the invention. Welding wire W' includes an outer low carbon metal sheath 120 having a center core 122. The core can be either a metal core or a flux core. Wire layer 130 is copper alloy as explained in connection with welding wire W. Thus, the copper alloy for the outer conductive layer 124 of welding wire can be used for solid wire, as shown in FIG. 2, or for cored wire as shown in FIG. 2A. Welding wire W has a layer 40 with a thickness a, as shown in FIG. 6. The thickness is normal for welding wire and is substantially greater than 1.0 microns and is formed from copper alloy. The novel alloy is such that the actual resistivity is at about 10-80% of the level of pure copper. This provides sufficient conductivity for current used in the welding process. In accordance with the first embodiment of the invention, the thickness a is not changed. Copper alloy for layers 40, 130 has the normal thickness a with the improvement being the physical action of the molten alloy as illustrated in the comparison between FIGS. 4 and 5.

Figure 7:
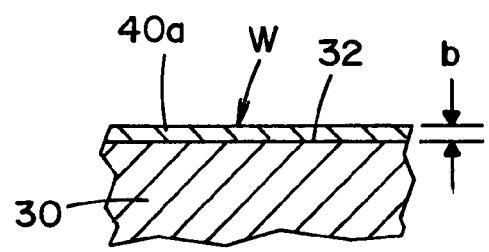
FIG. 7 is an enlarged cross-sectional view, similar to FIG. 6, showing one embodiment of the present invention where the amount of pure copper is reduced to decrease the available copper for forming particles or globulars of copper in the molten slag during the welding process as shown in FIG. 3.
Figure 8:
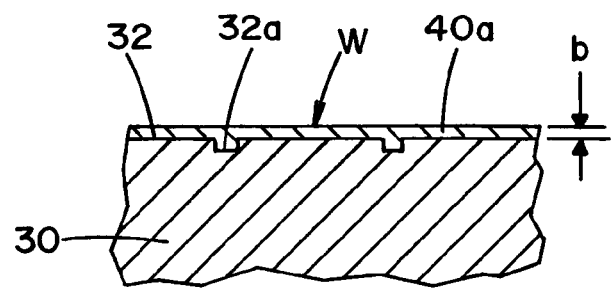
FIG. 8 is an enlarged cross-sectional view similar to FIG. 7 illustrating certain surface irregularities on the outer surface of the welding wire.

In accordance with another aspect of the present invention, the mass of each copper flake or particles 70 in flux 62 can be reduced by drastically reducing the thickness of layer 40 from the dimension a shown in FIG. 6 to the dimension b shown in FIG. 7. In accordance with this embodiment of the invention, layer 40a has a thickness b, which is less than 0.50 microns. Preferably the ultra-thin layer is in the range of 0.03 to 0.35 microns. Thus, any flakes or particles ablated from the outer layer of wire W are smaller. Furthermore, with a reduced thickness of the layer, there is a correspondingly reduced tendency to provide copper particles in the flux to cause grain boundary deterioration of the prior art. This second embodiment of the invention is the drastic reduction in the thickness of the layer when using pure copper. When using the novel thin layer of pure copper, normal indentations 32a on surface 32 are filled with the copper of layer 40a as shown in FIG. 8. Thus, the thickness b of layer 40a allows filling of irregularities along the surface to produce a smooth outer surface which has an exposed coating of pure copper without using the normal thickness of copper. Thus, there is less copper to ablate from the surface during the feeding procedure used in the welding process.

Figure 9:
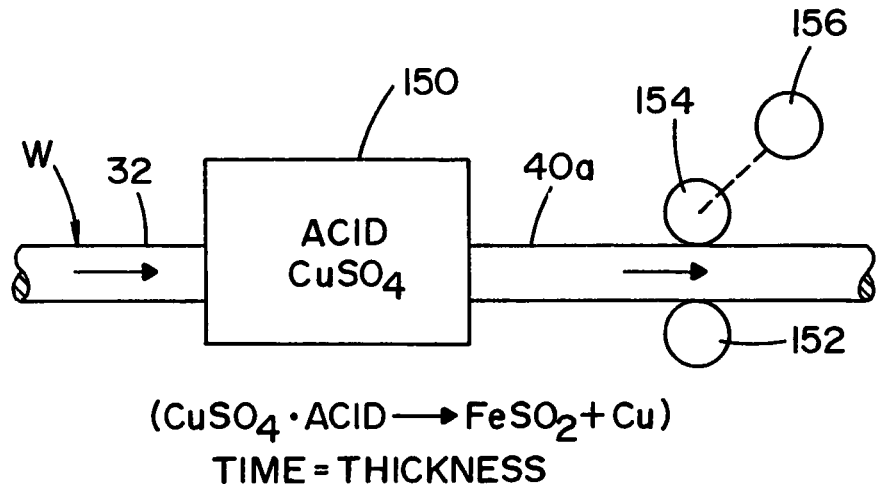
FIG. 9 is a schematic diagram illustrating the device for reducing the thickness of substantially pure copper as shown in FIG. 7; and, FIG. 10 is a schematic diagram illustrating the device for electroplating a copper alloy onto the surface of the advancing welding wire.
Figure 10:
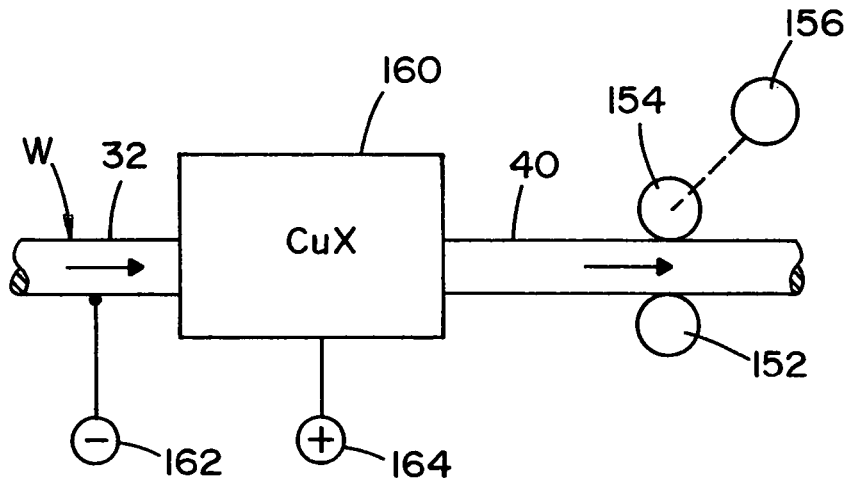

The two embodiments of the present invention can be manufactured by a variety of manufacturing processes; however, in practice, when the layer 40a is produced with a thickness of less than about 10 microns, wire W is passed through an acid bath 150 as shown in FIG. 9. The bath contains copper sulfate so a chemical reaction occurs wherein copper molecules replace iron molecules on surface 32 as wire W is conveyed through the acid bath 150. The conveyor is standard and schematically illustrated as rolls 152, 154 driven at the desired speed by motor 156. The speed and chemical concentration determines the thickness of the chemically deposited pure copper on surface 32. The resident time in bath 150 controls the thickness of copper layer 40a in accordance with standard manufacturing technology. Thus, motor 156 operates at the desired speed to control the thickness of layer 40a as it is conveyed through acid bath 150. This is the second embodiment of the present invention. The preferred embodiment of the present invention uses the manufacturing process schematically illustrated in FIG. 10. A electrolyte bath 160 contains solution of copper alloy to be deposited on surface 32 to form layer 40 by appropriate electrical connections, shown as a negative terminal 162 and a positive terminal 164. The molten metal bath of copper alloy is deposited by electroplating onto surface 32 to produce layer 40. As in FIG. 9, the conveyor is illustrated as motor 156 that drives feed rolls 152, 154. The motor controls the speed of wire W as it passes through the electrolytic bath 160 for electrically coating the copper alloy onto surface 32. In practice, the reduced layer 40a of pure copper is created by a chemical reaction, as shown in FIG. 9. The preferred embodiment of the present invention employing copper alloy involves electroplating the alloy onto the moving wire W to produce layer 40, as shown in FIG. 10. The layer can have the same thickness a as the prior art or the reduced dimension b, as discussed in connection with the second embodiment of the invention. Various processes can be used for obtaining the desired outer layer for the welding wire W. A representative process producing welding wire is shown in Inoue U.S. Pat. No. 6,079,243, incorporated by reference herein for general background.

Having thus defined the invention, the following is claimed:

1. An electric arc welding wire having a metal core with an outer surface and an electrically conductive metal layer on said outer surface of said metal core, said metal core including a cavity, said cavity filled with flux materials or metal materials, said electrically conductive metal layer forming the outer surface of said welding wire, said electrically conductive metal layer comprising a copper alloy wherein the copper content of said alloy is up to about 90 weight percent of said alloy, the effective resistivity of said layer is greater than $2.0 \times 10^{-8}$ ohm-meter at 20° C. and up to about $4.0 \times 10^{-8}$ ohm-meter at 20° C.

2. The electric arc welding wire as defined in claim 1, wherein said copper content of said copper alloy is about 60-90 weight percent of said alloy.

3. The electric arc welding wire as defined in claim 2, wherein said copper content of said copper alloy is about 60-80 weight percent.

4. The electric arc welding wire as defined in claim 3, wherein said copper alloy includes at least one metal selected from the group consisting of cadmium, chromium, nickel, tin, zinc, and mixtures thereof.

5. The electric arc welding wire as defined in claim 4, wherein said copper alloy includes nickel.

6. The electric arc welding wire as defined in claim 5, wherein said copper alloy includes about 20-40 weight percent nickel.

7. The electric arc welding wire as defined in claim 6, wherein said copper alloy includes about 30 weight percent nickel.

8. The electric arc welding wire as defined in claim 7, wherein said welding wire is designed for use in AC MIG welding.

9. The electric arc welding wire as defined in claim 8, wherein said electrically conductive metal layer is electroplated onto said outer surface of said metal core.

10. The electric arc welding wire as defined in claim 9, wherein said resistivity of said electrically conductive metal layer is about $2.7\text{-}3.74\times10^{-8}$ ohm-meter at 20° C.

11. The electric arc welding wire as defined in claim 10, wherein said metal core has an outer cylindrical metal surface.

12. The electric arc welding wire as defined in claim 1, wherein said copper alloy includes at least one metal selected from the group consisting of cadmium, chromium, nickel, tin, zinc, and mixtures thereof.

13. The electric arc welding wire as defined in claim 12, wherein said copper alloy includes nickel.

14. The electric arc welding wire as defined in claim 13, wherein said copper alloy includes about 20-40 weight percent nickel.

15. The electric arc welding wire as defined in claim 14, wherein said copper alloy includes about 30 weight percent nickel.

16. The electric arc welding wire as defined in claim 1, wherein said welding wire is designed for use in AC MIG welding.

17. The electric arc welding wire as defined in claim 1, wherein said electrically conductive metal layer is electroplated onto said outer surface of said metal core.

18. The electric arc welding wire as defined in claim 1, wherein said resistivity of said electrically conductive metal layer is about $2.7\text{-}3.74\times10^{-8}$ ohm-meter at 20° C.

19. The electric arc welding wire as defined in claim 1, wherein said metal core has an outer cylindrical metal surface.

* * * * *